(12) United States Patent
Bonnar et al.

(10) Patent No.: US 10,836,298 B1
(45) Date of Patent: Nov. 17, 2020

(54) BULK LIQUID FLEXIBLE TANK SYSTEM

(71) Applicants: Ty F Bonnar, Simi Valley, CA (US);
Michael Agins, Chicago, IL (US)

(72) Inventors: Ty F Bonnar, Simi Valley, CA (US);
Michael Agins, Chicago, IL (US)

( * ) Notice: Subject to any disclaimer, the term of this patent is extended or adjusted under 35 U.S.C. 154(b) by 177 days.

(21) Appl. No.: 16/004,642

(22) Filed: Jun. 11, 2018

Related U.S. Application Data

(60) Provisional application No. 62/518,750, filed on Jun. 13, 2017.

(51) Int. Cl.
| | | |
|---|---|---|
| *B65D 35/56* | (2006.01) | |
| *B60P 3/22* | (2006.01) | |
| *B62D 53/00* | (2006.01) | |
| *B65D 88/22* | (2006.01) | |

(52) U.S. Cl.
CPC ............ *B60P 3/2215* (2013.01); *B62D 53/00* (2013.01); *B65D 88/22* (2013.01)

(58) Field of Classification Search
CPC ........... B60P 3/22; B60P 3/222; B60P 3/2215; B65D 88/22
USPC .................................................. 280/837, 839
See application file for complete search history.

(56) References Cited

U.S. PATENT DOCUMENTS

| | | | | |
|---|---|---|---|---|
| 4,573,508 | A * | 3/1986 | Knaus .................... | B65D 88/16 220/562 |
| 5,188,460 | A * | 2/1993 | Dorse .................... | B65D 88/22 220/495.06 |
| 6,726,052 | B1 * | 4/2004 | Miller ................ | B65D 88/1606 220/666 |
| 6,877,537 | B1 * | 4/2005 | Crow .................... | B60C 19/122 152/200 |
| 7,717,296 | B1 * | 5/2010 | Guthrie ................. | B65D 88/22 220/563 |
| 9,586,753 | B2 * | 3/2017 | Hanson ................ | B65D 88/744 |
| 2010/0260588 | A1 * | 10/2010 | Martin .................. | B65D 88/16 414/495 |
| 2012/0132650 | A1 * | 5/2012 | Buonerba ............... | B60P 3/426 220/1.6 |
| 2013/0101237 | A1 * | 4/2013 | Kohen ................. | B65D 90/046 383/38 |
| 2014/0133951 | A1 * | 5/2014 | Thomas ............. | B65D 88/1606 414/800 |
| 2014/0301669 | A1 * | 10/2014 | Baeck .................. | B63B 35/285 383/3 |
| 2016/0130078 | A1 * | 5/2016 | Galvin ................. | B65D 90/046 141/1 |
| 2018/0148253 | A1 * | 5/2018 | Postek ................. | B60N 2/6036 |

* cited by examiner

*Primary Examiner* — Tony H Winner
(74) *Attorney, Agent, or Firm* — Sandy Lipkin

(57) ABSTRACT

A transport system for hauling non-hazardous bulk liquids via dry van with a trailer that contains two or more deflatable, flexible bladder tanks that are pressure tested and welded to the trailer bed of the dry van. The bed is pre-lined to avoid puncture. Upon delivery to its destination, the flexible, deflatable bladder tanks are drained completely and deflated, ready for re-use.

6 Claims, 3 Drawing Sheets

BULK LIQUID FLEXIBLE TANK SYSTEM

REFERENCE TO PRIOR APPLICATION

This application claims priority of the provisional patent application 62/518,750, filed Jun. 13, 2017 entitled BULK LIQUID FLEXIBLE TANK TRANSPORT SYSTEM by Ty F. Bonnar and Walt Dorn (Walt Dorn being erroneously named as an inventor).

BACKGROUND OF THE INVENTION

Field of the Invention

The field of this invention relates generally to the field of systems for the transport of liquids and more particularly toward a system that utilizes flexible, refillable tanks inside of 53' or smaller trailers and intermodal containers.

Description of the Prior Art

When transporting non-hazardous liquids over long distances, the task has traditionally been performed through the use of pipelines or through tanker trucks. There are limitations to both of these methods, which include high cost, limited availability and volume restrictions.

The instant invention seeks to overcome the limitations of the prior art methods in that it offers a high-volume, low-cost solution to the task of transporting non-hazardous liquids across roadways and railways.

SUMMARY OF THE INVENTION

The basic embodiment of the present invention teaches a transport system for non-hazardous liquids comprising: a delivery truck with a trailer; one or more flexible, deflatable bladder tanks housed inside of said trailer; wherein said flexible bladder tanks are fillable with non-hazardous liquids for transport across roadways and wherein said flexible, deflatable bladder tanks are drainable upon arrival at the destination of said delivery truck.

The above embodiment can be further modified by defining that said flexible, deflatable bladder tanks are reusable.

The above embodiment can be further modified by defining that said flexible, deflatable bladder tanks are made of high density polyester reinforced thermoplastic.

The above embodiment can be further modified by defining that said flexible, deflatable bladder tanks are RF welded to said trailer.

The above embodiment can be further modified by defining that said non-hazardous liquids can be housed in said flexible, deflatable bladder tanks at a temperature ranging from −94 to 200 degrees Fahrenheit.

The above embodiment can be further modified by defining that said flexible, deflatable bladder tanks are pressure tested prior to use.

The above embodiment can be further modified by defining that said trailer is lined prior to installation of said flexible, deflatable bladder tanks to avoid puncture of said flexible, deflatable bladder tanks.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Figure 1:
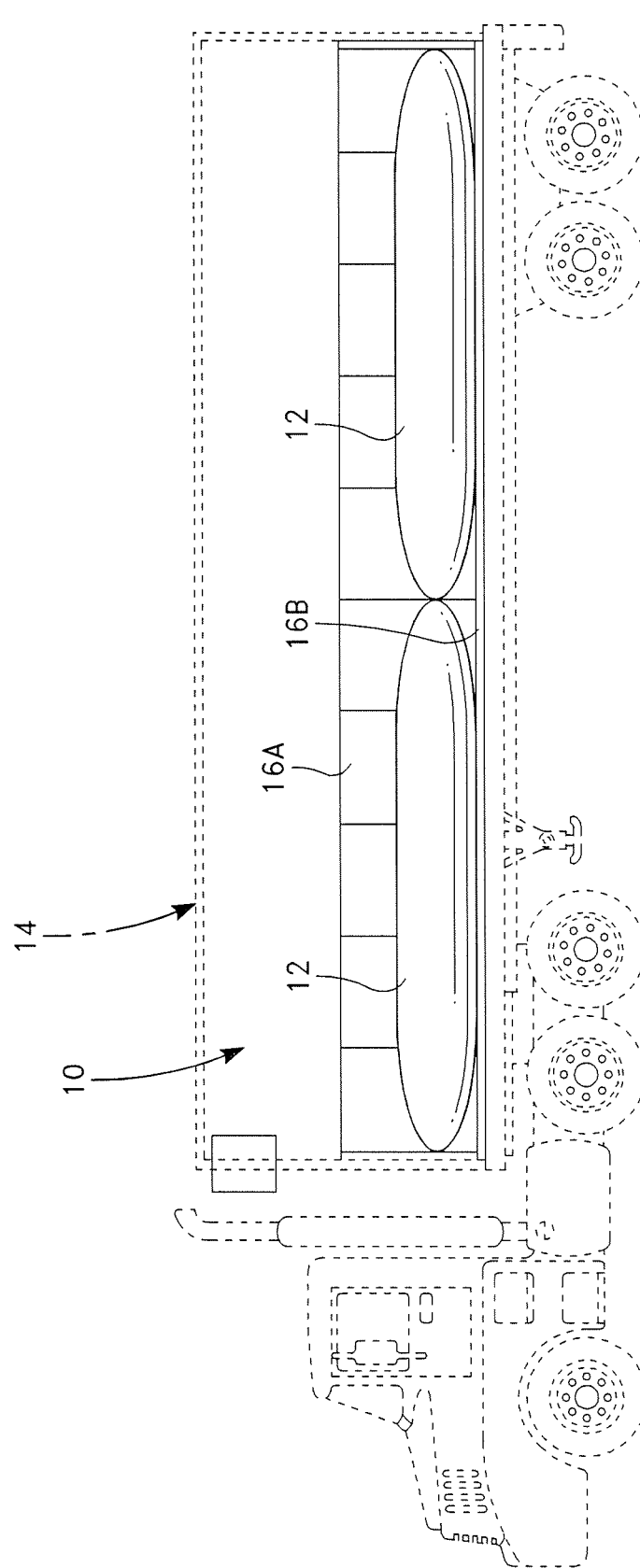
FIG. 1 is a side view of the preferred embodiment of a delivery truck (in phantom) showing two bladder tanks as situated inside.

Turning to the drawings, the preferred embodiment is illustrated and described by reference characters that denote similar elements throughout the several views of the instant invention.

The preferred embodiment of the instant invention provides for a flexible, cost-effective, eco-friendly bulk transport system 10 for non-hazardous liquids that is comprised primarily of the use of two or more engineered, flexible bladders 12 that act as flexible tanks for over the load delivery of non-hazardous liquids. The two or more tanks 12 allow for the safe and sound domestic over-the-road and railroad transport of non-hazardous liquids that is cost-effective due to the ability to transport larger volumes of liquid relative to the cost of fuel over prior art methods. Furthermore, the tanks 12 are re-usable thereby eliminating replacement costs and reducing waste, making the system eco-friendly.

Figure 3:
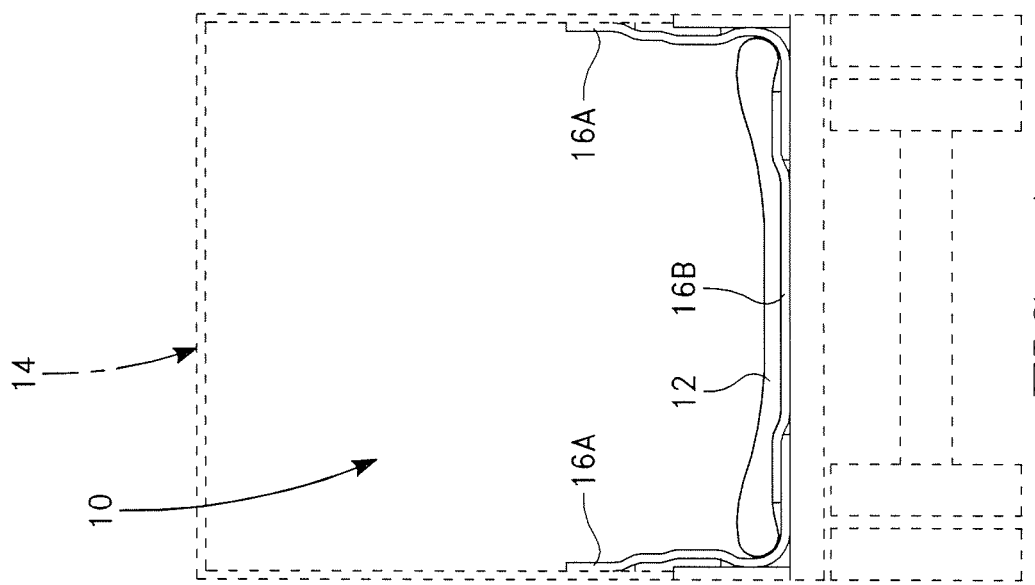
FIG. 3 is a rear view of the trailer portion of a delivery truck showing how the bladder appears in the truck will vary depending on how full the bladder is with liquid.
Figure 4:
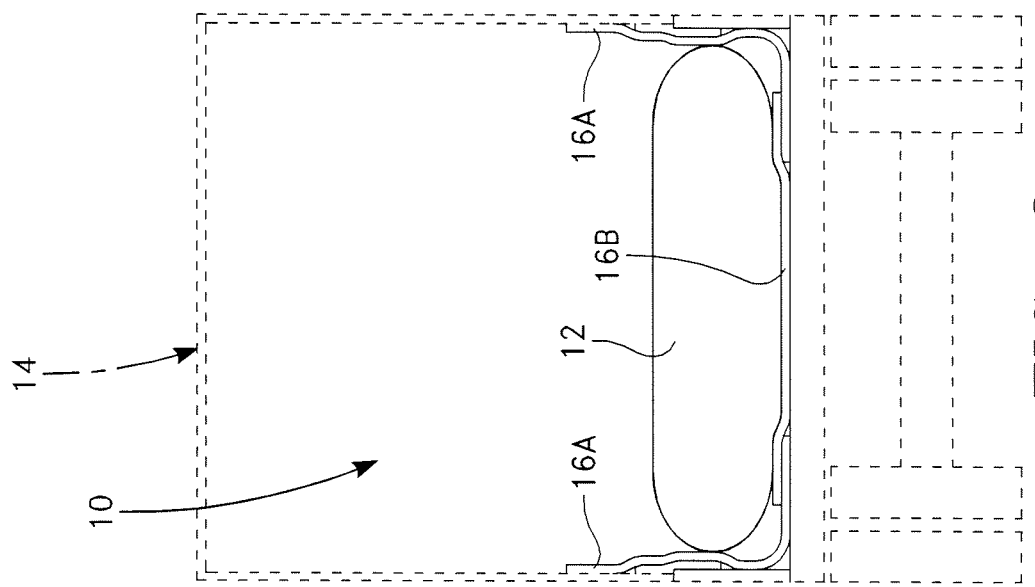
FIG. 4 is a rear view of the trailer portion of a delivery truck with the bladders deflated.

The flexible tanks deflate when not in use (See FIG. 4) and are inflatable when they are ready to be deployed for use (See FIG. 3). With the instant system, a 53' dry van 14 is converted into a liquid transport vehicle 10, 10B through the installation of the flexible bladders 12. Using the dry van provides flexibility to haul bulk liquid loads and reduce transport costs over prior art methods.

The two or more engineered flexible bladder tanks 12 are made of heavy duty polyester reinforced thermoplastic that is compatible with a wide range of food and industry liquids. The components are 100% RF welded and use standard industry Camlock 2" or 3" fittings and the entire system is pressure tested. Furthermore, the temperature range is from −94 degrees to 200 degrees Fahrenheit. The tanks are robust and reusable.

Figure 2:
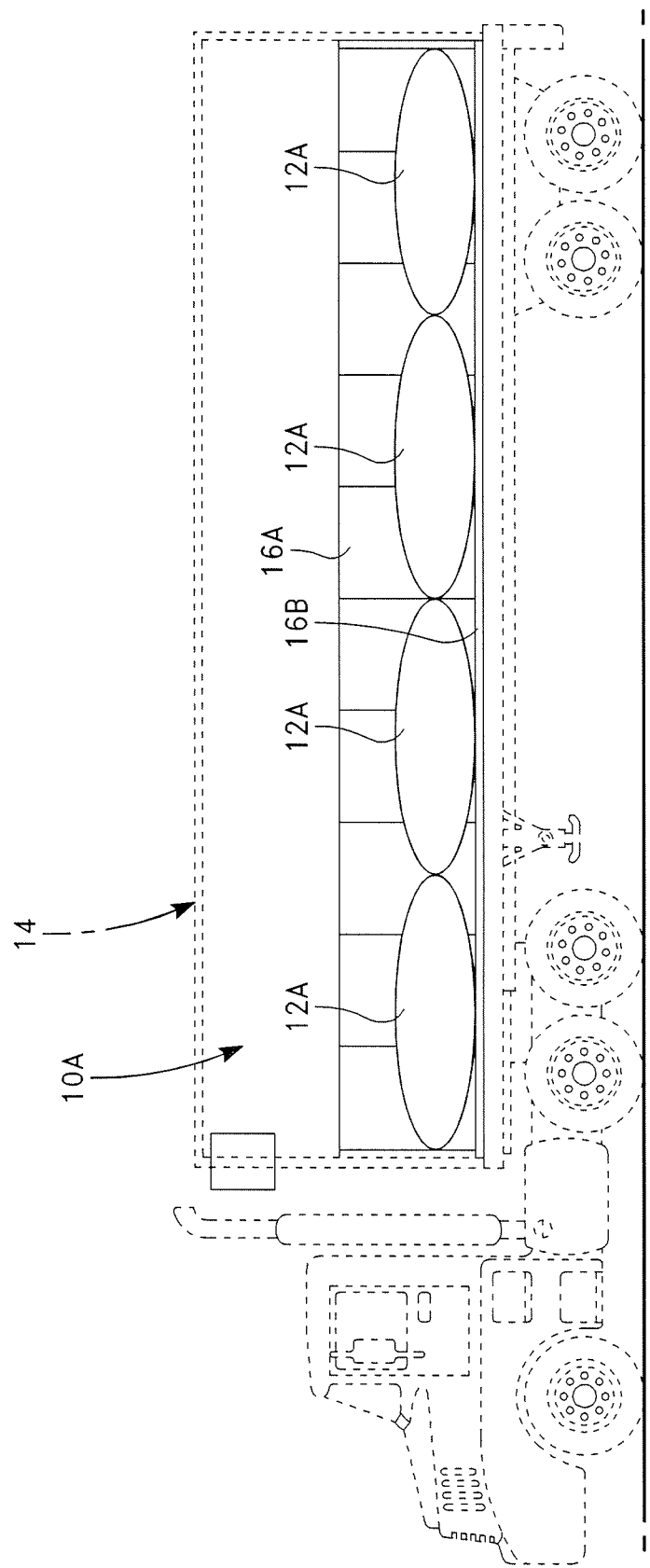
FIG. 2 is a side view of an alternate embodiment of a delivery truck (in phantom) showing four bladder tanks as situated inside.

An alternate embodiment 10B shown in FIG. 2 shows the use of four flexible bladder tanks 12. While the preferred embodiment 10 includes a two tank 12 system, the system can alternatively include three or four tanks 12. This allows users to move different products at once or have metered loads for several destinations delivered with one load.

The high volume capacity far exceeds that of ISO trucks and tank trucks. The tanks are easy to install and haul and they provide a 100% discharge of the hauled product.

The dry van bed 14 or container is first lined 16A, 16B to avoid any possible puncture points from the dry van 14 and the flexible bladder tanks 12. The liner kit is 50' long×102" wide×24" tall. It is a pre-scored 60"×60" sheet that is scored dead center to create 2"×30" flaps. Ideally, there are thirty-five 60"×60" tiles per trailer or corrugated B flute in rolls.

The invention illustratively disclosed herein suitably may be practiced in the absence of any element which is not specifically disclosed herein.

The invention illustratively disclosed herein suitably may be practiced in the absence of any element which is not specifically disclosed herein.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A transport system for non-hazardous liquids comprising:
   a delivery truck with a dry van trailer, said dry van trailer being 53' or smaller;
   one or more flexible, deflatable bladder tanks housed inside of said dry van trailer;
   wherein said one or more flexible bladder tanks are is fillable with non-hazardous liquids for transport across roadways and wherein said flexible, deflatable bladder tanks are drainable upon arrival at the destination of said delivery truck and said 53' or smaller dry van trailer.

2. The transport system as defined in claim 1 wherein said one or more flexible, deflatable bladder tanks is reusable.

3. The transport system as defined in claim 1 wherein said one or more flexible, deflatable bladder tanks is made of high density polyester reinforced thermoplastic.

4. The transport system as defined in claim 1 wherein said 53' or smaller dry van trailer is lined prior to installation of said one or more flexible, deflatable bladder tanks to avoid puncture of said one or more flexible, deflatable bladder tanks.

5. The transport system as defined in claim 1 wherein said non-hazardous liquids can be housed in said one or more flexible, deflatable bladder tanks at a temperature ranging from −94 to 200 degrees Fahrenheit.

6. The transport system as defined in claim 1 wherein said one or more flexible, deflatable bladder tanks is pressure tested prior to use.

* * * * *